Nov. 21, 1950  F. E. PAYNE  2,531,079
COOLED AND LUBRICATED ROTARY SEAL

Filed Feb. 18, 1948  2 Sheets-Sheet 1

INVENTOR.
Frank E. Payne
BY
Charles F. Vojtech
atty

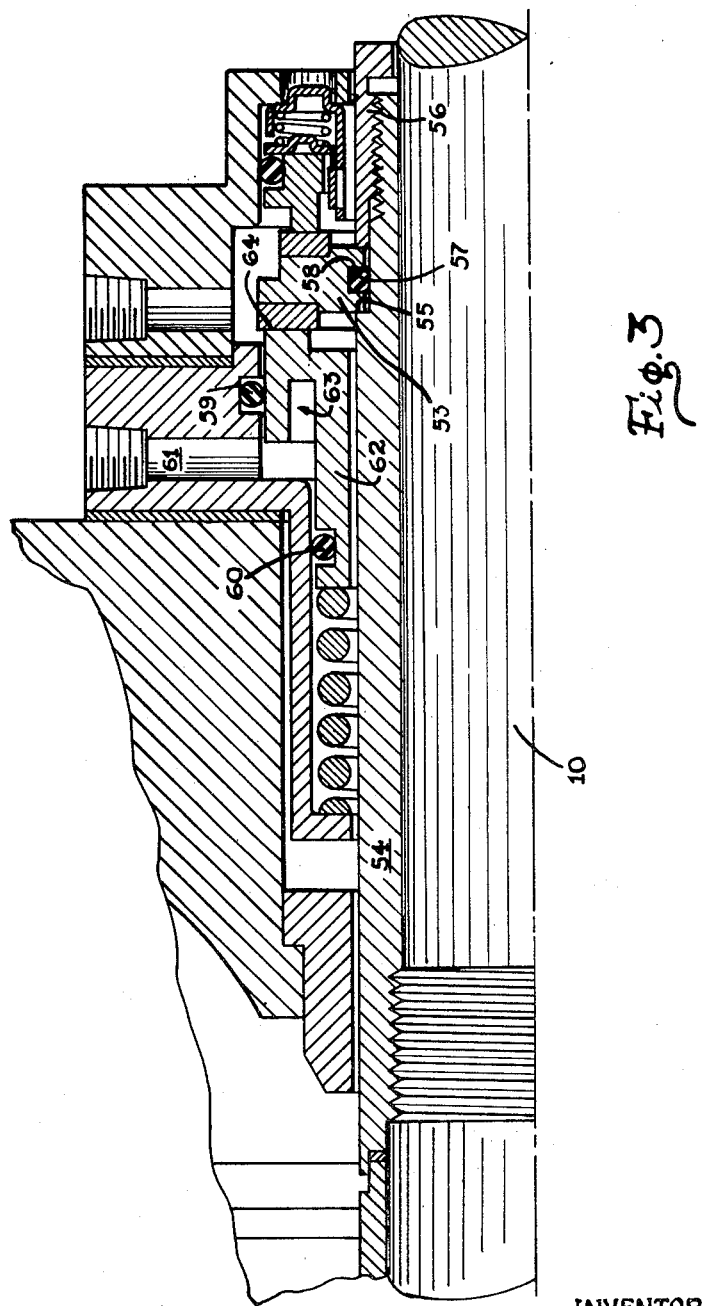

Patented Nov. 21, 1950

2,531,079

UNITED STATES PATENT OFFICE 2,531,079

COOLED AND LUBRICATED ROTARY SEAL

Frank E. Payne, Glencoe, Ill., assignor to Crane Packing Company, Chicago, Ill., a corporation of Illinois Application February 18, 1948, Serial No. 9,084

6 Claims. (Cl. 286—9)

This invention relates to rotary seals of the mechanical type and particularly to seals for installations wherein the seal is cooled and lubricated in order to secure long uninterrupted service.

In equipment of the above type requiring the use of a seal, it is customary to provide a stuffing box of considerable length which extends into the housing of the equipment. Where the equipment is used to handle a volatile fluid such as propane, packing may not be sufficiently tight to do an efficient sealing job. The more efficient simple mechanical seals, however, cannot properly seal the fluid because of the heat developed between the relatively rotating sealing surfaces of the mechanical seal and because of the lack of lubrication, both of which result in rapid wear of the sealing surfaces.

It has been found to be desirable to cool and lubricate any mechanical seal used in pumps for volatile fluids such as propane, but up to the present time it has not been feasible to provide both lubrication and cooling without the use of a complicated and expensive structure.

The principal object of this invention, therefore, is to provide a mechanical seal for a pump or the like wherein means are provided for cooling the seal and also lubricating the running faces thereof, said seal being simple in construction and also conserving space.

Another object of this invention is to provide a seal for a pump or the like wherein a greater portion of the seal may be located outside the housing of the pump so as to be more readily cooled and lubricated.

Yet another object of this invention is to provide a lubricated and cooled seal which may be applied to a pump designed to use ordinary packing, the seal being so designed that it can be removed and replaced with packing.

Figure 1:
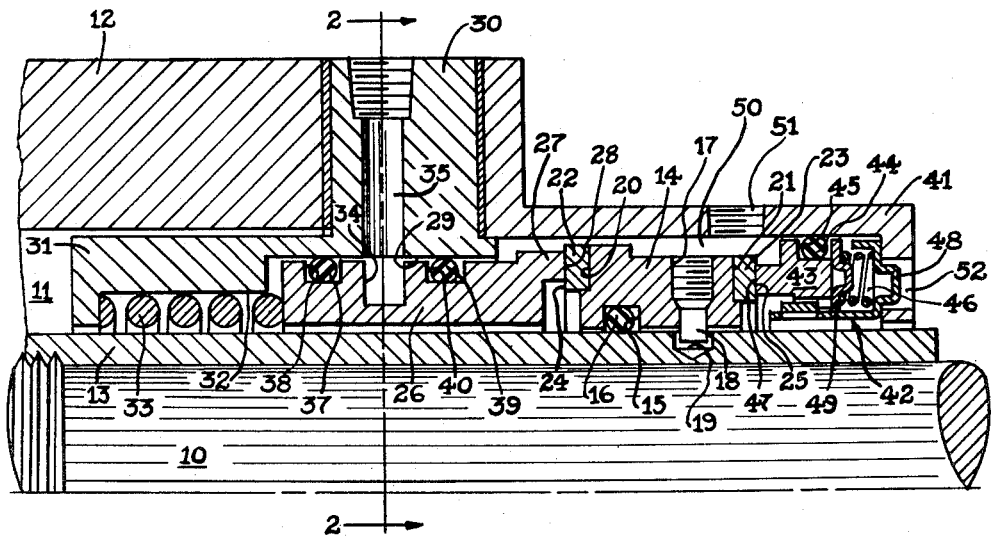
Figure 2:
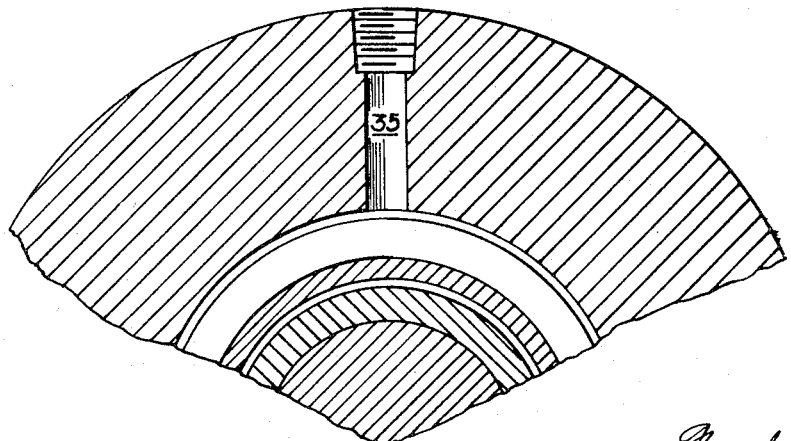

These and other objects of this invention will become apparent from the following detailed description when taken together with the accompanying drawings, in which Fig. 1 is a quarter-section view of a seal embodying the features of this invention;

Fig. 2 is a fragmentary elevation taken along line 2—2 of Fig. 1 showing the inlet and outlet passages for the coolant used in the seal; and Fig. 3 is a quarter-section view of a modification of the seal of Fig. 1.

Referring now to the drawings for a detailed description of the invention and particularly to Fig. 1, the pump shaft is shown at 10 passing through an opening 11 in a housing 12. Opening 11 is partially closed by a sleeve 13 which is threaded on shaft 10 so as to be rotatable therewith and also to have a fluid-tight connection with the shaft. Sleeve 13 is commonly used so that any packing which may be placed in opening 11 will not score the shaft 10 but will nevertheless be sealed with respect to the shaft. It is contemplated that this invention can be adapted for use with sleeve 13 so that if an emergency should arise requiring the removal of a seal, packing may be inserted into the opening 11 and the apparatus run temporarily without any great danger of leakage and without any substantial loss of time.

Surrounding sleeve 13 is a rigid collar 14 which has an internal groove 15 machined or otherwise formed therein. An endless ring 16 of resilient deformable material such as rubber or the like, either natural or synthetic or a combination of the two, is compressed in recess 15 so as to form a fluid-tight seal between collar 14 and sleeve 13. Recess 15 is of greater axial dimension than ring 16 so that said ring 16 can rock in recess 15 to a limited extent and thereby prevent sticking of the ring either in the recess 15 or on sleeve 13. Collar 14 has a threaded opening 17 in which is disposed a setscrew 18, the bottom of which projects into a blind hole 19 formed in sleeve 13. The diameter of hole 19 is greater than the diameter of setscrew 18 so that a limited amount of universal movement is permitted collar 14 on sleeve 13, but collar 14 is, nevertheless, constrained to rotate with sleeve 13 at all times. Setscrew 18 thus serves to remove substantially all of the torque load from ring 16. The radial surfaces of collar 14 are notched at 20 and 21 to receive inserts 22 and 23, respectively, of a material different from the material of collar 14, said inserts being particularly adapted to withstand the conditions imposed thereon by the apparatus on which the seal is used. Thus, inserts 22 and 23 may be rings of Stellite which is a hard material capable of taking a high polish and resisting wear. The outer surfaces 24 and 25 of inserts 22 and 23, respectively, are disposed in radial planes and are accordingly ground and lapped so as to be perfectly flat and smooth.

A sealing washer 26 is disposed in a recess 29 in a closure-plate 30 which is bolted or otherwise secured to housing 12. Said washer 26 is formed with an axially extending rib or head 27 having a radially disposed surface 28 which is ground and lapped so as to be perfectly flat and smooth. Said closure-plate has an axial flange 31 extending into opening 11 and has a smaller recess 32 in which is located a helical spring 33. Said spring is normally in compression and tends to urge washer 26 against collar 14 thereby maintaining surfaces 28 and 24 in contact with one another at all times and effecting a fluid-tight seal therebetween.

Washer 26 is cooled by means of a fluid such as water or the like which is introduced into a groove 34 formed in the exterior surface of washer 26 by means of an inlet passage 35. A similar passage (not shown) located substantially 180° away from passage 35 may be used as an outlet for the cooling water. Any suitable fittings may be used to conduct the water to and from closure-plate 30. The water is confined to the exterior of washer 26 by a ring 37 of resilient deformable material compressed between washer 26 and the recess 29, washer 26 being provided with a groove 38 to retain ring 37. The cooling fluid is confined on the opposite side of groove 34 by means of a similar endless ring 39 compressed between recess 29 and washer 26 and disposed in a groove 40 in said washer. Rings 37 and 39 are preferably made of rubber, either natural or synthetic or a combination of the two, and are formed with a circular radial cross-section so as to be capable of rocking slightly when washer 26 moves axially relative to plate 30 under the action of spring 33. Such rings are commonly known as O rings and are available in different rubber stocks to handle various fluids.

Collar 14 and the projecting portion of washer 26 are enclosed by a small housing 41 which is bolted to closure-plate 30 with a gasket therebetween so as to render the connection fluid-tight. Housing 41 extends axially beyond collar 14 so as to provide a space for a seal designated generally by the reference character 42. This seal is of the type disclosed and claimed in a copending application of Charles F. Voytech, Serial No. 715,973, filed December 13, 1946. It is understood, however, that other seals of the mechanical rotary type may be used, although the type shown is preferred because of its short axial dimension. Briefly, the seal 42 is comprised of a washer 43 having a radially disposed surface 47 in contact with surface 25 on insert 23, surface 47 being suitably ground and lapped so as to be perfectly flat to form with surface 25 a fluid-tight running fit. Washer 43 is sealed with respect to housing 41 by means of an endless ring 44 similar to rings 37 and 39 which is disposed in a recess 45 in washer 43 and compressed between said washer 43 and the interior wall of housing 41. A plurality of springs 46 in compression between a driving shell 48 and a confining washer 49 serve to maintain washer 43 in continuous contact with insert 23. Shell 48 has lugs which extend into openings 52 in housing 41 so as to prevent shell 48 from turning relative to the housing. It is apparent thus far that a fluid-tight seal is effected between collar 15 and housing 41 so that a chamber 50 is formed around collar 14 and washers 26 and 43.

In order to lubricate the running faces of washers 26, 43 and collar 14, chamber 50 is filled with a lubricant through an opening 51 which is threaded to receive a fitting such as a grease cup or the like. If desired, other openings may be provided in housing 41 to permit the lubricant to be circulated in chamber 50, but such circulation ordinarily would not be required since washer 26 will be cooled by the coolant in groove 34 and any heat generated by the cooperating surfaces will be dissipated in the coolant.

To assemble the seal a closure-plate 30 is slipped over a sleeve 13 against housing 12 and a spring 33 is inserted into recess 32. Rings 37 and 39 are placed into grooves 38 and 40 and the washer is pressed into recess 29. Next, a ring 16 is inserted into the groove 15 of a collar 14 and the collar is slipped over sleeve 13 and pushed against washer 26 until setscrew 18 is aligned with hole 19, whereupon setscrew 18 is advanced into hole 19 to hold collar 14 on the sleeve. It is understood that the free height of spring 33 is greater than the axial dimension of the spring shown in Fig. 1 and that during the assembly of the collar on the sleeve, spring 33 will be compressed to its working height.

After collar 14 is in place on sleeve 13, a seal 42 is pressed into a housing 41 to the position shown in Fig. 1 and the shell is then slipped over the seal against plate 30, a suitable gasket having been previously placed between the housing and plate. The housing is then drawn up tight against the plate and the latter is secured to the housing 12, any well-known means being usable for this purpose. Connections are then made with passage 35 to the source of coolant to be used, and chamber 50 is filled with a lubricant. The seal is then ready for use.

In the event the seal must be removed and the equipment operated while the seal is repaired or serviced, a stuffing box gland may be bolted to housing 12 in place of plate 30 and the space 11 packed with suitable packing, with a gland nut to compress the packing in the space.

The location of collar 14 outside the space 11 and the cooling of washer 26 results in a more efficient cooling of the seal since most of it is out of contact with the hot fluid being sealed. The lubricant in chamber 50 also acts as an oil quench in the event the volatile fluid should escape and attempt to flash.

The modification shown in Fig. 3 differs from that of Fig. 1 mainly in the means for securing the rotating collar to the shaft. The collar is shown at 53 and is made narrower than collar 14. Sleeve 54 is threaded on shaft 10 and is formed with a shoulder 55 against which collar 53 abuts. A second sleeve 56 is threaded on the end of sleeve 54 and clamps collar 53 tightly against shoulder 55 so that collar 53 is constrained to rotate with sleeve 54. A fluid-tight seal is effected between collar 53 and sleeve 54 by means of an endless ring of packing 57 preferably made of rubber or the like, which is compressed in a groove 58 in collar 53 and against the outer surface of sleeve 54. It will be observed that this construction is inherently balanced and yet rigidly locates collar 53 on sleeve 54 and provides a reliable drive for the said collar.

The cooled washer of Fig. 3 is modified so that packing ring 59 is of a larger diameter than packing ring 60. This obviates the necessity of having ring 60 under compression when it is pushed over opening 61 which tends to injure the surface of the ring, and also permits the formation of washer 62 in such a manner that a passage 63 for coolant can be located close to the sealing surface 64 where it can be more effective. The cooled washer per se is claimed in a co-pending application of Vance E. Vorhees, Serial No. 9,267 filed February 18, 1948.

It is understood that the foregoing description is illustrative of preferred embodiments of this invention and that the scope of the invention is not to be limited thereto, but is to be determined by the appended claims.

What is claimed is:

1. A sealing device for effecting a seal between a shaft and a housing therefor, said device comprising a removable sleeve fixed to said shaft, a collar encircling the sleeve and having radially disposed sealing surfaces on each side, means for preventing relative rotation between the collar and shaft, resilient deformable sealing means effecting a seal between the collar and sleeve, a sealing washer on one side of the collar and having a sealing surface abutting on the adjacent sealing surface of said collar, means for effecting a seal between the washer and housing, means for cooling the washer, a second sealing washer, said second sealing washer contacting the other sealing surface on the collar, means on the housing enclosing the collar and sealing washers, resilient deformable means for effecting a seal between the second sealing washer and the enclosing means, and lubricant in the enclosing means in contact with the ring and sealing washers.

2. A seal device for effecting a seal between a shaft and a housing therefor, said housing including a closure-plate having an axial extension and having passages for conducting a coolant toward the shaft, and including also a cup-shaped extension adapted to be secured to the plate with a fluid-tight fit, said seal comprising a washer concentrically disposed with respect to the shaft and movable axially with respect to the plate, said washer having a pair of external grooves, sealing means in the grooves for effecting a seal between the washer and closure-plate, a third groove located between the pair of grooves, said passages in the plate being in communication with the third groove and with the exterior of the plate, a collar surrounding the shaft and sealed with respect thereto, said collar having a surface in contact with the washer and forming therewith a fluid-tight seal and means for effecting a seal between the collar and said cup-shaped extension, said extension being filled with lubricant.

3. A seal device as described in claim 2, a setscrew on said collar, a sleeve passing through the collar and having an opening into which the setscrew projects, whereby to hold said collar against axial movement when subjected to fluid pressure.

4. A seal device as described in claim 2, said axial extension on the closure-plate having a recess and a spring compressed in said recess by the washer and tending to hold the washer in sealing engagement with the collar.

5. A sealing device for effecting a seal between a shaft and a housing therefor, said device comprising a sleeve threaded on said shaft and having an abutment, a collar encircling the sleeve and having radially disposed sealing surfaces on each side, means for clamping the collar against the abutment to cause the collar to rotate with the shaft, resilient deformable sealing means effecting a fluid-tight seal between the collar and sleeve, a sealing washer on one side of the collar and having a sealing surface abutting on the adjacent sealing surface of said collar, means for effecting a seal between the washer and housing, means for cooling the washer, a second sealing washer, said second sealing washer contacting the other sealing surface on the collar, means on the housing enclosing the collar and sealing washers, resilient deformable means for effecting a seal between the second sealing washer and the enclosing means, and lubricant in the enclosing means in contact with the ring and sealing washers.

6. A sealing device as described in claim 5, the means for clamping the collar against the abutment comprising additional threads on the sleeve, a second sleeve having threads cooperating with the additional threads to advance the second sleeve toward the collar, and an abutment on the second sleeve adapted to engage the collar and urge said collar against the abutment on the first-mentioned sleeve.

FRANK E. PAYNE.

REFERENCES CITED

The following references are of record in the file of this patent:

UNITED STATES PATENTS

| Number | Name | Date |
| --- | --- | --- |
| 1,294,620 | Clarke | Feb. 18, 1919 |
| 1,560,669 | Dennedy | Nov. 10, 1925 |
| 2,265,953 | Mortensen et al. | Dec. 9, 1941 |
| 2,281,157 | Kanuch et al. | Apr. 28, 1942 |
| 2,306,417 | Wiessner | Dec. 29, 1942 |